United States Patent [19]

Taylor

[11] Patent Number: 5,575,354
[45] Date of Patent: Nov. 19, 1996

[54] CALIBRATED ENGINE LUBRICANT DISPENSER

[75] Inventor: Donald S. Taylor, Jupiter, Fla.

[73] Assignee: Taylor Mechanicals, Incorporated, Jupiter, Fla.

[21] Appl. No.: 490,295

[22] Filed: Jun. 15, 1995

[51] Int. Cl.⁶ .................................. F16N 27/00
[52] U.S. Cl. .................. 184/7.4; 184/32; 184/105.1; 123/73 AD
[58] Field of Search ................ 123/73 AD, 196 R; 184/6.28, 7.4, 32, 18, 105.1

[56] References Cited

U.S. PATENT DOCUMENTS

| | | | |
|---|---|---|---|
| 4,069,835 | 1/1978 | Stadler | 137/114 |
| 4,121,631 | 10/1978 | Jones | 123/73 AD |
| 4,262,710 | 4/1981 | Nomura et al. | 123/73 AD |
| 4,286,632 | 9/1981 | Abel | 141/18 |
| 4,594,971 | 6/1986 | Borst | 123/73 |
| 4,596,277 | 6/1986 | Djordjevic | 123/73 AD |
| 4,846,118 | 7/1989 | Slattery et al. | 123/73 |
| 4,955,943 | 9/1990 | Hensel et al. | 123/73 |
| 4,971,118 | 11/1990 | Cluff | 141/103 |
| 5,327,861 | 7/1994 | Rogalla et al. | 184/7.4 |
| 5,402,913 | 4/1995 | Graf | 222/63 |

FOREIGN PATENT DOCUMENTS

| | | | |
|---|---|---|---|
| 284739 | 11/1990 | Germany | 184/7.4 |
| 6159587 | 6/1994 | Japan | 184/7.4 |
| 1655479 | 6/1991 | U.S.S.R. | 184/7.4 |

*Primary Examiner*—Erick R. Solis
*Attorney, Agent, or Firm*—Pennie & Edmonds

[57] ABSTRACT

A calibrated engine lubricant dispenser has a lubricant reservoir, which houses the engine lubricant where the lubricant is stored for dispensing. An existing engine fuel container is aligned with the dispenser. When the user activates the dispensing, a calibrated amount of engine lubricant is dispensed from the reservoir into the engine fuel container. The engine lubricant mixes with the engine fuel in the engine fuel container so that the proper proportion of engine lubricant versus engine fuel is obtained in the engine fuel container.

17 Claims, 4 Drawing Sheets

7
CALIBRATED ENGINE LUBRICANT DISPENSER

TECHNICAL FIELD OF THE INVENTION

This invention relates to devices that dispense engine lubricant so that the engine lubricant may be mixed with engine fuel, and more particularly, to dispensers that dispense engine lubricant in proper proportions in relation to the engine fuel.

BACKGROUND OF THE INVENTION

Most two-cycle internal combustion engines require that the user mix two-cycle engine lubricant or oil with the engine fuel or gasoline in the proper proportions, such as, five ounces of engine lubricant per one gallon of gasoline. The mixing of the engine lubricant and fuel must occur prior to refueling the engine.

If the proper ratio of engine lubricant per gasoline is not achieved, and the engine is refueled with the inappropriate mixture, problems with the engine's operation, performance, and efficiency will occur. Over an extended period of time, an improper lubricant to fuel ratio will affect the engine's performance and may induce a series of mechanical problems including engine stalling, rough idle, carbon build-up on spark plugs, inefficient fuel consumption, internal carbon build-up, and premature engine wear.

Prior U.S. Patents have the addressed the mixing of fuel and engine additives.

For example, U.S. Pat. No. 4,286,632 issued to Abel discloses a fuel and oil mixing device that has a separate oil reservoir from the fuel tank and a solenoid actuated valve and pump to mix the fuel and oil together.

U.S. Pat. No. 4,594,971 issued to Borst discloses a variable fuel/oil ratio pump for a two-stroke internal combustion engine. The device emits pressure pulses to communicate with the engine.

U.S. Pat. No. 4,846,118 issued to Slattery et al. discloses a duel fuel pump and oil-fuel mixing valve system for use on a boat engine.

U.S. Pat. No. 4,955,943 issued to Hensel et al, discloses a metering pump controlled oil injection system for two-cycle engines that utilizes a fuel supply control and metering pump to deliver oil to the fuel supply system.

U.S. Pat. No. 4,971,118 issued to Cluff discloses a fuel additive mixing system that uses a metering valve for metering the flow of oil, or other mixture, into the flow of fuel as the fuel tank is being filled with a nozzle.

And U.S. Pat. No. 4,069,835 issued to Stadler discloses a fuel and lubricant mixer that operates by being placed directly onto the engine fuel tank and then the dispenser accepts a fuel hose nozzle. However, the mixer requires that the user attach the mixer to the fuel tank, refuel the engine, and then detach the mixer from the tank. Many two-cycle engines are not refuelled with a fuel nozzle, for example, lawn mowers are typically refueled by a fuel container, which may not have a spout long enough or rigid enough to activate the mixer disclosed in the patent.

All of the patents described above require either that the device be attached directly to the engine fuel tank, fuel nozzle, or that the device be integrated into the engine fuel system. None of the prior art patents provide a simple solution for consistently mixing the proper ratio of engine lubricant and engine fuel.

What is needed is a lubricant dispensing device that is operated separately from the engine gas tank and fuel nozzle and that consistently provides the proper mixing ratio of engine lubricant versus engine fuel.

DISCLOSURE OF THE INVENTION

It is, therefore, an object of the present invention to provide a lubricant dispensing device that is operated separately from the engine fuel tank, fuel nozzle, and engine fuel system.

It is also an object of the present invention to provide a lubricant dispensing device that consistently dispenses the proper proportion of engine lubricant versus engine fuel.

It is also an object of the present invention to provide a lubricant dispensing device that may be either mechanically or electrically operated.

It is also an object of the present invention to provide a lubricant dispensing device that may be operated with a variety of engine fuel containers.

It is also an object of the present invention to provide a lubricant dispensing device that dispenses a predetermined amount of lubricant with every cycle of operation.

It is also an object of the present invention to provide a lubricant dispensing device that may be either attached to a stationary object or may be attached to a portable cart.

According to the present invention, an engine lubricant dispenser has a lubricant reservoir, a mounting system, and means for dispensing.

The reservoir houses the engine lubricant where the lubricant is stored for dispensing. An existing engine fuel container is aligned with the dispenser and the means for dispensing. When the user activates the means for dispensing, a calibrated amount of engine lubricant is dispensed from the reservoir into the engine fuel container. The engine lubricant mixes with the engine fuel in the engine fuel container so that the proper proportion of engine lubricant versus engine fuel is obtained in the engine fuel container.

In the preferred embodiment, a calibrated one-way directional flow pump is used for the means for dispensing, with the calibrated one-way pump dispensing one ounce of engine lubricant from the reservoir with every cycle of the pump. Most two-cycle engines require an engine lubricant mixture in the engine fuel with one ounce ratios, therefore, in the preferred embodiment, the one-way pump is calibrated to dispense one ounce of engine lubricant with each cycle, and the pump remains primed after each cycle with one ounce of engine lubricant so that the pump is primed and ready for the next cycle of operation.

In a separate embodiment, the means for dispensing utilizes an electric switch for activating the calibrated one-way pump for dispensing the engine lubricant from the reservoir into the fuel container with every pump cycle. The switch may be activated by placement of the fuel container onto the dispenser or by the user activating the switch.

The foregoing and other advantages of the present invention will become more apparent from the following description and accompanying drawings.

BEST MODE FOR CARRYING OUT THE INVENTION

Figure 1:
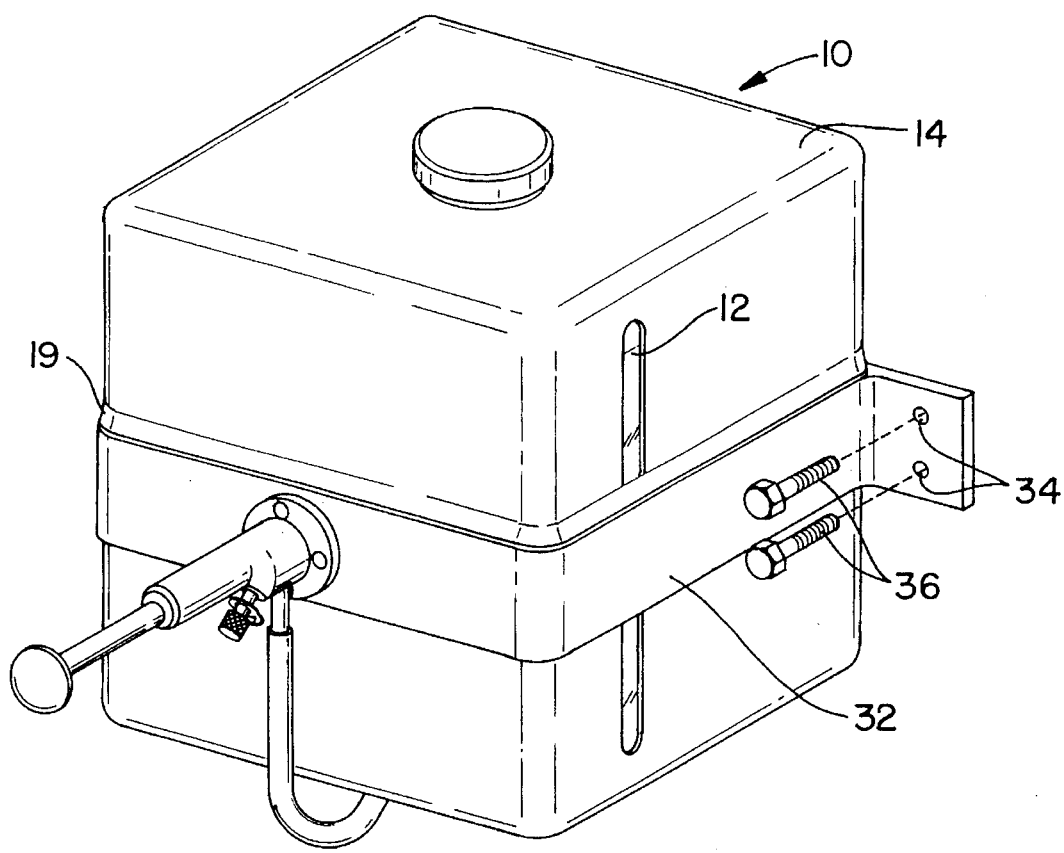
FIG. 1 is a front perspective view of a calibrated engine lubricant dispenser of the present invention.

According to the present invention, and as shown in FIG. 1, a calibrated engine lubricant dispenser 10 is shown, the dispenser 10 dispenses acalibrated amount of engine lubricant 12 when activated.

Figure 2:
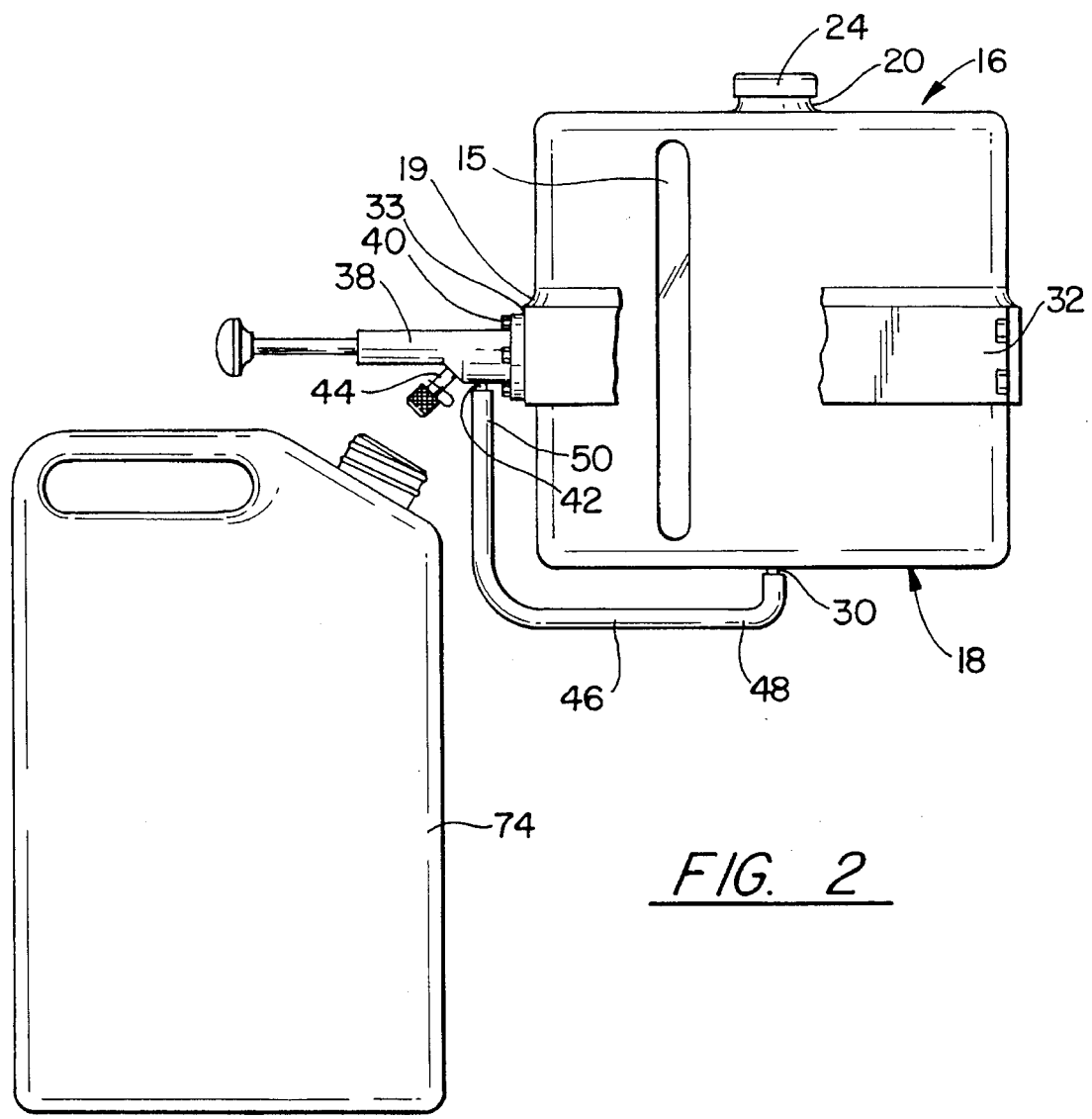
FIG. 2 is a side view of the calibrated engine lubricant dispenser of the present invention.

As shown in FIG. 2, the dispenser 10 has a reservoir 14 for storing the engine lubricant 12. The reservoir 14 has a view window 15, a topside portion 16, and an underside portion 18. The view window 15 aids the user when filling the reservoir 14 with engine lubricant 12, in determining when to fill the reservoir 14 when the engine lubricant 12 level is low, and in general, so that the user may visually determine the lubricant level in the reservoir 14.

Extending from the topside portion 16 is a lip 20, the lip 20 having an opening 22. A vented reservoir cap 24 communicates with the lip 20 and the opening 22 so that the reservoir cap 24 seals the engine lubricant 12 inside the reservoir 14. The reservoir cap 22 is vented so as to allow air into the reservoir 14 so that the engine lubricant 12 may be pumped out of the reservoir 14 without creating a vacuum inside of the reservoir 14.

Figure 3:
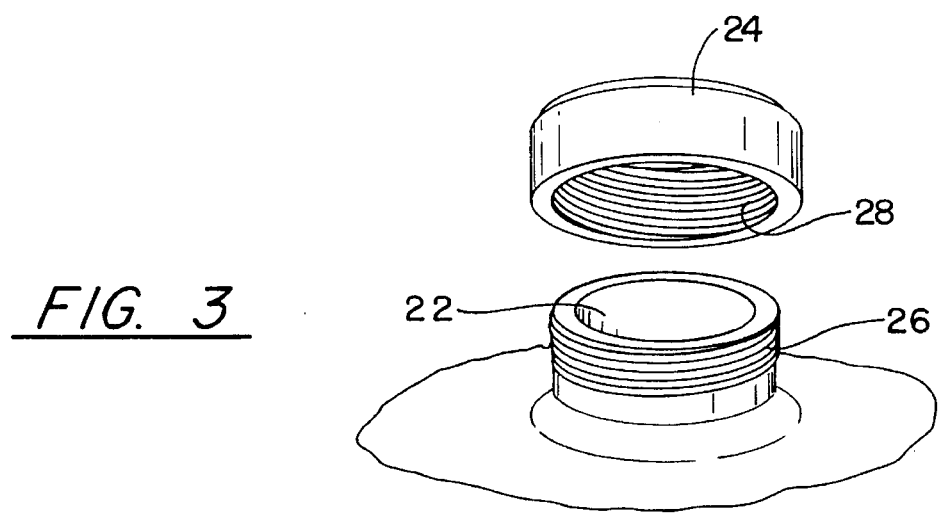
FIG. 3 is a close-up perspective view of a reservoir topside portion with a threaded lip and a threaded cap.

In the preferred embodiment, and as shown in FIG. 3, the lip 20 has male threads 26 and the reservoir cap 24 has female threads 28 so that the female threads 28 are engaged with the male threads 26 when the reservoir cap 24 is threaded onto the lip 20.

The reservoir 14 has an external ridge 19 extending around the exterior perimeter.

The underside portion 18 of the reservoir 14 has an exit coupling 30 that extends from the underside portion 18.

A bracket 32 houses the reservoir 14 by enveloping or encompassing the outside perimeter of the reservoir 14. The bracket 32 has a top side surface 33 so that when the reservoir 14 is placed inside of the bracket 32, the reservoir external ridge 19 rests atop of the bracket top side surface.

The bracket also has a plurality of openings 34 so that an equal number of fasteners 36 may pass through the openings 34 and attach the engine lubricant dispenser 10 to a fixed object, such as a wall, bench, or other stationary object.

A one-way directional flow pump 38 is fixedly attached to the bracket 32 by a plurality of fasteners 40. The pump 38 has an input coupling 42 and an output coupling 44.

A connecting tube 46 has a first end 48 and a second end 50. The first end 48 securely attaches to the reservoir exit coupling 30. The second end 50 securely attaches to the pump input coupling 42.

Figure 4:
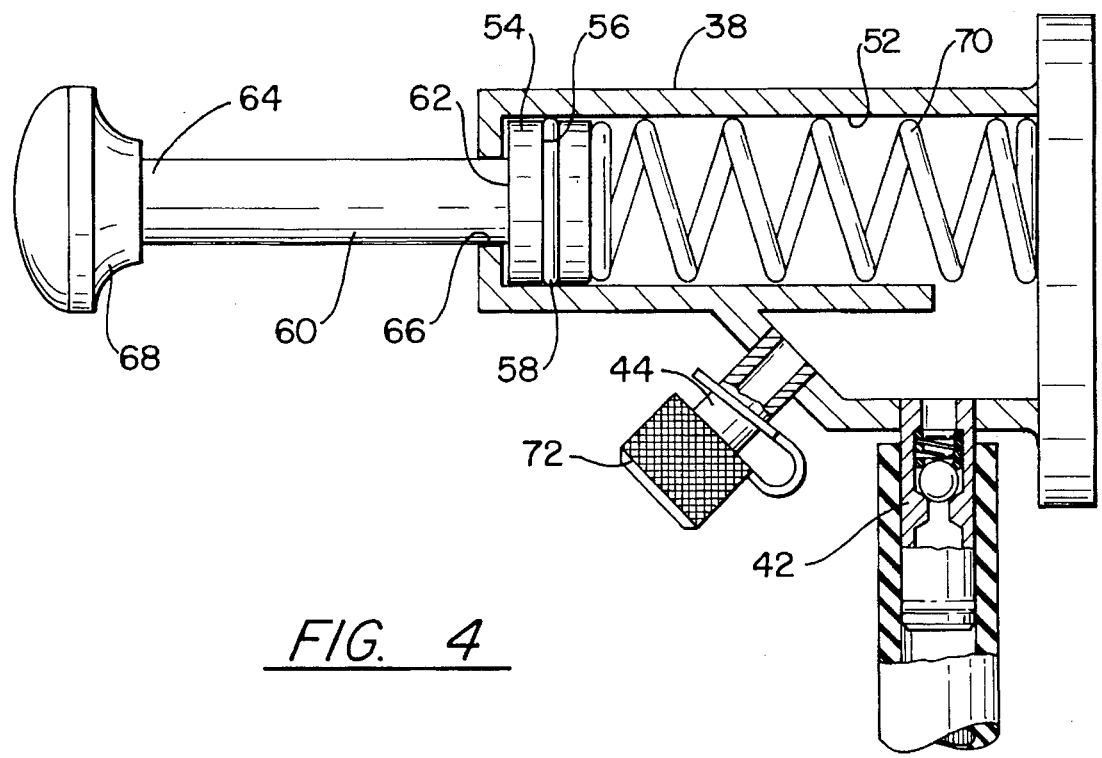
FIG. 4 is a cross sectional view of a one-way directional flow pump that may be used with the present invention.

As shown in FIG. 4, the pump 38 has an internal bore 52. A piston head 54 fits internal of the internal bore 52. The piston head 54 has an O-ring groove 56 that houses an O-ring seal 58. The O-ring seal 58 is in sealing contact with the internal bore 52.

Extending from the piston head 54 is a piston shaft 60. The piston shaft 60 has a piston end 62 and a handle end 64. The piston end 62 extends from the piston head 54 through a pump opening 66. A handle or knob 68 is attached to the handle end 64.

A pump spring 70 is housed internal of the internal bore 52 so as to bias the piston head 54 at an extended position.

An output coupling cap 72 is securely fastened to the output coupling 44 so as to prevent dripping of the engine lubricant out of the pump 38.

The input coupling 40 is a one-way check valve so that engine lubricant 12 may exit the reservoir 14 and enter the pump 38 via the connecting tube 46, but not exit the pump 38, therefore, the pump 38 is a one-way directional flow pump.

The reservoir 14 is filled with engine lubricant 12 by the user. The user removes the output coupling cap 72 from the output coupling 44. The user then places an existing fuel container 74 under the output coupling 44, and as the user pushes and applies force to the pump knob 68, placing the piston head 54 in the compressed position in relation to the pump 38, the engine lubricant 12 in the pump 38 is forced to exit the pump 38 and the output coupling 44 as the piston head 54 and O-ring seal 58 compress the engine lubricant 12 in the internal bore 52. Therefore, a predetermined amount of engine lubricant 12 is displaced into the fuel container 74 at the proper proportion in relation to the engine fuel.

As the spring 70 displaces the piston head 54 and O-ring seal 58 back to the at rest position, one ounce of engine lubricant 12 is displaced by vacuum from the reservoir 14 into the pump 38, where the lubricant 12 is stored for the next pump cycle, and so that the pump remains primed with engine lubricant.

The engine lubricant 12 is displaced from the reservoir 14 into the fuel container 74 at the rate of one ounce of engine lubricant per every valve cycle. Depending on the particular engine requirements, the user may activate or cycle the pump 38 to obtain precisely the proper and predetermined amount of engine lubricant 12 needed in the fuel container 74. Therefore, the calibrated engine lubricant dispenser 10 may be used for a variety of engines that require engine lubricant 12 to be mixed with the engine fuel.

Some engines may require one ounce of engine lubricant per one gallon of engine fuel, other engines may require two ounces of engine lubricant per one gallon of engine fuel, either requirement, plus a variety of other ratios, could be satisfied with the calibrated engine lubricant dispenser 10 of the present invention.

In addition, if the ratio of engine lubricant versus engine fuel needed was not in one ounce intervals, the pump 38 and internal bore 52 may be modified to dispense a wide variety of amounts, such as, one-half of a ounce, one and one-half of a ounce, etcetera.

The calibrated engine lubricant dispenser 10 of the present invention has been successfully made using a one ounce displacement calibrated pump, model number 301B, part number 63625T84, which may be purchased from Dema Engineering Company, St. Louis, Mo.

Figure 5:
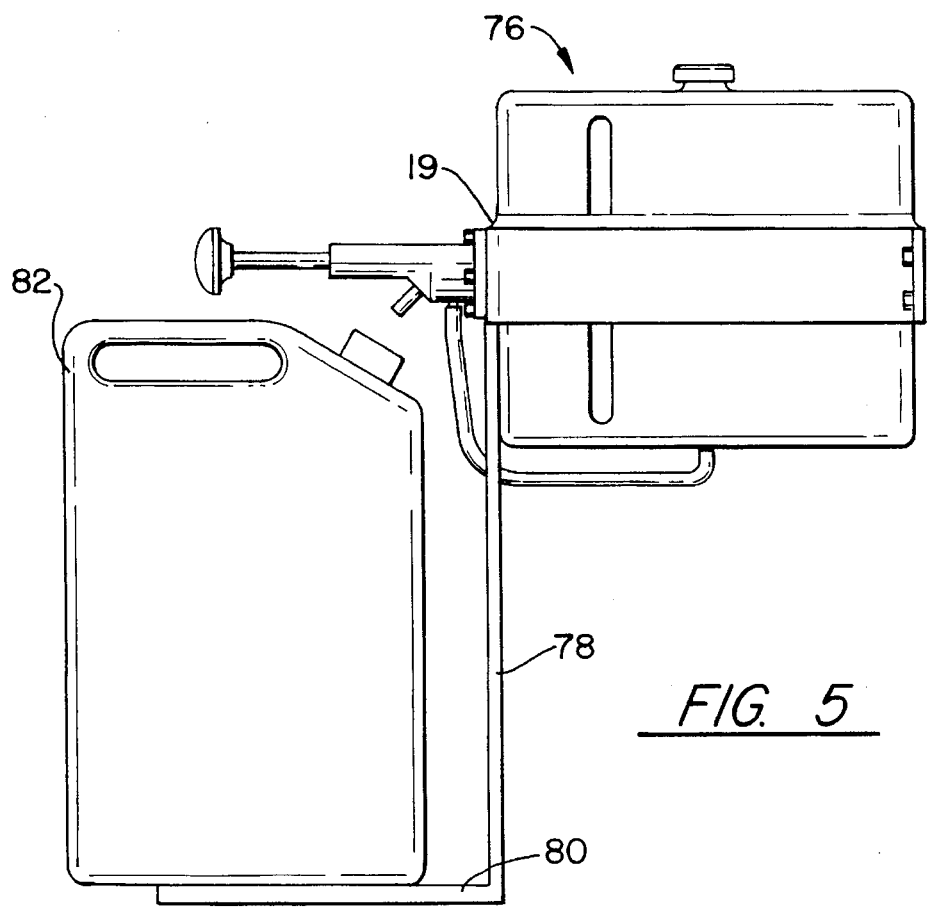
FIG. 5 is a separate embodiment of a calibrated engine lubricant dispenser of the present invention.

In a separate embodiment of the present invention and referring to FIG. 5, a calibrated engine lubricant dispenser 76 is essentially the same as the preferred embodiment described above, except that a bracket 78 extends longitudinally from the reservoir 14. The bracket 78 has a lateral section 80 that is fixedly attached to the bracket 78 so that the user may rest a five gallon fuel container 82 on the lateral section 80 while the fuel container 82 is being filled with the engine lubricant.

Figure 6:
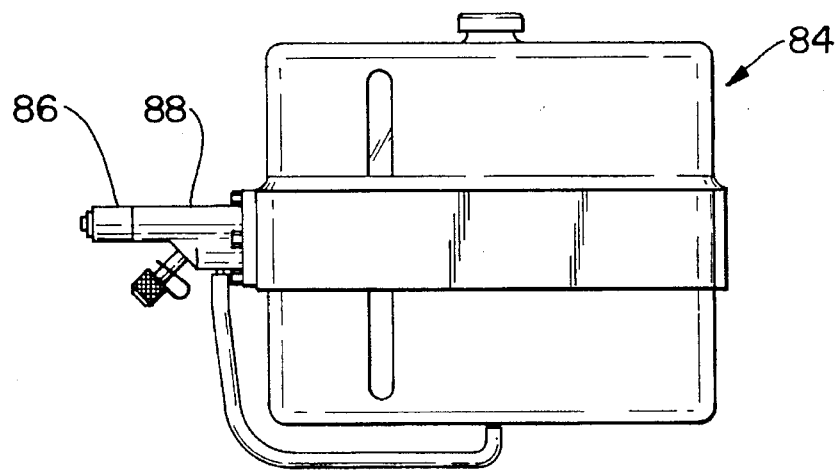
FIG. 6 is a separate embodiment of a calibrated engine lubricant dispenser of the present invention that utilizes an electrical switch for activating a dispensing pump.

In separate embodiment and as shown in FIG. 6, a calibrated engine lubricant dispenser 84 is essentially the same as the preferred embodiment described in detail above, except that the dispenser 84 has an electric switching mechanism 86 to activate a calibrated one-way directional flow pump 88. The switch 86 may be activated manually by the user or operator, or may be activated by a solenoid micro-switch when the fuel container is placed into position under the pump 88. The micro-switch may be placed on the pump 88 or on a bracket lateral piece similar to the bracket described in FIG. 5. The micro-switch would activate the pump 88 to cycle, so as to displace and dispense one ounce of engine lubricant into the fuel container.

Figure 7:
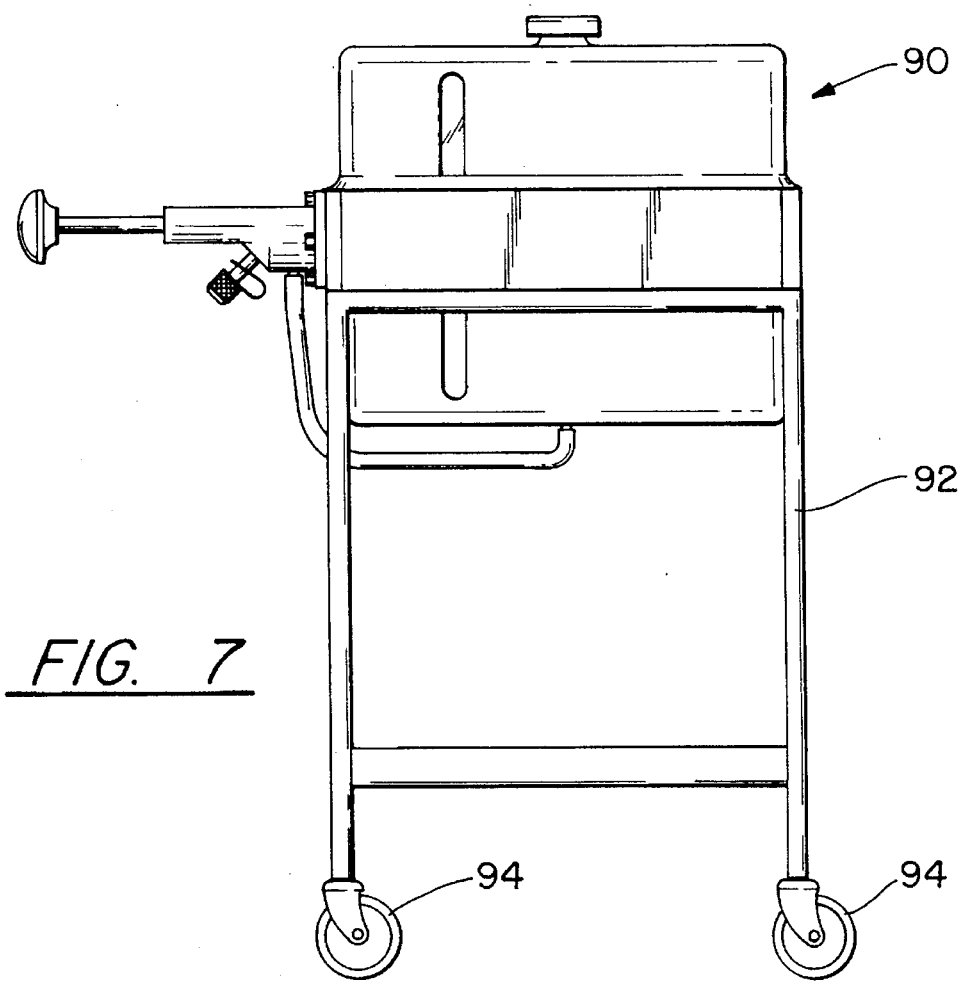
FIG. 7 is a separate embodiment of a calibrated engine lubricant dispenser of the present invention, wherein the dispenser is mounted onto a portable cart.

In yet a separate embodiment and referring now to FIG. 7, a calibrated engine lubricant dispenser 90 is essentially the same as the preferred embodiment described in detail above, except that the dispenser 90 is mounted to a portable cart 92. The portable cart 92 has a plurality of wheels 94 that allow the dispenser 90 to be rolled to different locations, such as in a maintenance shop where lawn mowers and other machinery may be stored and wherein the dispenser 90 could be taken directly to the machinery for the convenience of the user.

The calibrated engine lubricant dispensing device of the present invention is operated separately from the machinery engine gas tank and fuel pump nozzle. The dispensing device consistently provides a predetermined and proper mixing ratio of engine lubricant versus engine fuel into a fuel container, essentially preventing many engine performance and operation problems that are common today with engines that require an oil and gas mixture in the fuel.

Although this invention has been shown and described with respect to a detailed embodiment, those skilled in the art will understand that various changes in form and detail may be made without departing from the spirit and scope of the claimed invention.

We claim:

1. An engine lubricant dispensing device, comprising:

a reservoir for storing engine lubricant;

means for dispensing the engine lubricant from the reservoir into a separate portable engine fuel container that is independent from and not attached to an engine or an engine powered device, the means for dispensing being calibrated so that a predetermined amount of engine lubricant is dispensed into the engine fuel container, the means for dispensing the engine lubricant, having a biasing means so that the means for dispensing is in a ready-to-pump position that remains primed with the predetermined amount of engine lubricant.

2. The engine lubricant dispensing device of claim 1, further comprising:

means for attaching the engine lubricant dispensing device to a stationary fixed object.

3. The engine lubricant dispensing device of claim 1, further comprising:

means for attaching the engine lubricant device to a portable assembly.

4. The engine lubricant dispensing device of claim 2, the means for attaching the engine lubricant dispensing device to a stationary fixed object further comprising:

the reservoir having an outside perimeter;

a bracket partially encompassing the outside perimeter of the reservoir;

a plurality of fasteners extending through the bracket so that the bracket may be attached to a stationary fixed object, the bracket securing the reservoir to the fixed object.

5. The engine lubricant dispensing device of claim 4, the reservoir further comprising:

an exterior ridge extending around the exterior perimeter of the reservoir;

the bracket having a top side surface so that the reservoir may be placed inside of the bracket with the reservoir external ridge resting atop of the bracket top side surface.

6. The engine lubricant dispensing device of claim 1, the means for dispensing further comprising:

a calibrated one-way directional flow pump so that when the pump is cycled, a predetermined amount of engine lubricant is dispensed into the engine fuel container.

7. The engine lubricant dispensing device of claim 6, further comprising:

a tube extending from the underside of the reservoir to the one-way pump, the tube connecting the reservoir with the one-way pump.

8. The engine lubricant dispensing device of claim 6, wherein the calibrated one-way pump is activated by an electrical switch.

9. The engine lubricant dispensing device of claim 6, further comprising:

the reservoir having a view window so that the user may visually determine the lubricant level in the reservoir.

10. The engine lubricant dispensing device of claim 6, the one-way pump further comprising:

a piston having a piston head;

the pump having an internal bore and an outlet coupling, the piston head being in sealing contact with the internal bore, so that when the piston is extended, the lubricant is drawn into the pump from the reservoir, and when the piston is compressed, the lubricant in the pump is dispensed through the outlet coupling.

11. The engine lubricant dispensing device of claim 6, the biasing means further comprising:

a spring to bias the piston head to the extended position so that the pump remains primed with engine lubricant.

12. The engine lubricant dispensing device of claim 1, wherein the means for dispensing further comprises a pump with an inlet flow path and an outlet flow path, the inlet flow path having a check valve to allow the engine lubricant to flow into but not out of the means for dispensing.

13. The engine lubricant dispensing device of claim 12, wherein the pump further comprises a piston and an output coupling so that when the piston is biased in the extended position, the engine lubricant is drawn through the check valve into the pump and so that when the piston is compressed, the lubricant exits the pump by the output coupling.

14. An engine lubricant dispensing device, comprising:

a reservoir for storing engine lubricant, the reservoir having an outside perimeter and a view window so that the user may visually determine the lubricant level in the reservoir;

a bracket partially encompassing the outside perimeter of the reservoir;

a plurality of fasteners extending through the bracket so that the bracket may be attached to either a stationary fixed object or a portable assembly, the bracket securing the reservoir to the object or the assembly;

a calibrated one-way directional flow pump so that when the pump is cycled, a predetermined amount of engine lubricant is dispensed into an existing engine fuel container, the pump having a spring to bias the piston head to the extended position so that the pump remains primed with predetermined amount of engine lubricant;

a tube extending from the reservoir to the one-way pump;

the one-way pump having a piston, an internal bore, and an outlet coupling;

the piston having a piston head, the piston head being in sealing contact with the internal bore, so that when the piston is extended, the lubricant is drawn into the pump from the reservoir through the tube, and when the piston is compressed, the lubricant in the pump is dispensed through the outlet coupling.

15. The engine lubricant dispensing device of claim 14, the pump further comprising:

a spring to bias the piston head to the extended position so that the pump remains primed with engine lubricant.

16. The engine lubricant dispensing device of claim 14, wherein the calibrated one-way directional flow pump is activated by an electrical switch.

17. The engine lubricant dispensing device of claim 16, wherein the electrical switch is a micro-switch that is activated when the fuel container is placed into position for accepting the engine lubricant from the dispensing device.

* * * * *